(12) United States Patent
Mullaney

(10) Patent No.: US 9,347,821 B1
(45) Date of Patent: May 24, 2016

(54) REFUSE CONTAINER WITH WEIGHT INDICATOR AND DANGER ALERTING

(76) Inventor: Gregory Mullaney, Cockeysville, MD (US)

( * ) Notice: Subject to any disclaimer, the term of this patent is extended or adjusted under 35 U.S.C. 154(b) by 338 days.

(21) Appl. No.: 13/601,983

(22) Filed: Aug. 31, 2012

(51) Int. Cl.
| | | |
|---|---|---|
| *G01G 19/62* | (2006.01) | |
| *B30B 9/30* | (2006.01) | |
| *G01G 23/37* | (2006.01) | |
| *G06Q 10/00* | (2012.01) | |

(52) U.S. Cl.
CPC ............ *G01G 19/62* (2013.01); *G01G 23/3707* (2013.01); *G01G 23/3728* (2013.01); *G06Q 10/30* (2013.01); *B30B 9/3007* (2013.01)

(58) Field of Classification Search
CPC ............ G01G 19/62; G01G 23/3707; G01G 23/3728; B30B 9/3007; G06Q 10/30
USPC .......................... 177/238–245, 25.13, 177, 45
See application file for complete search history.

(56) References Cited

U.S. PATENT DOCUMENTS

| | | | |
|---|---|---|---|
| 1,852,973 A | | 4/1932 | Justus |
| 2,069,499 A | | 2/1937 | Martin et al. |
| 3,321,036 A | * | 5/1967 | Keenan et al. ................. 177/245 |
| 3,559,204 A | * | 1/1971 | Dashper ......................... 177/245 |
| 3,655,003 A | * | 4/1972 | Yamajima ...................... 177/245 |
| 4,407,191 A | | 10/1983 | Brenner |
| 5,173,866 A | * | 12/1992 | Neumann ............. B30B 9/3007 100/229 A |
| 5,416,706 A | | 5/1995 | Hagenbuch |
| 5,558,013 A | * | 9/1996 | Blackstone, Jr. ...... B30B 9/3042 100/218 |
| 5,641,947 A | | 6/1997 | Riddle, Jr. |
| 5,650,596 A | * | 7/1997 | Morris et al. ............... 177/25.13 |
| 5,878,376 A | * | 3/1999 | Schurr .......................... 702/102 |
| 6,123,017 A | * | 9/2000 | Little ..................... B30B 9/3007 100/229 A |
| 6,408,261 B1 | * | 6/2002 | Durbin .................. B30B 9/3007 100/99 |
| 6,777,623 B2 | * | 8/2004 | Ballard ........................ 177/25.13 |
| 6,894,232 B2 | * | 5/2005 | Waggoner et al. .......... 177/25.15 |
| 6,998,541 B2 | * | 2/2006 | Morris et al. .................... 177/15 |
| 7,146,294 B1 | * | 12/2006 | Waitkus, Jr. ........... B30B 9/3007 100/99 |
| 7,151,231 B2 | | 12/2006 | Kamakau |
| 7,161,097 B1 | | 1/2007 | Gorgone |
| 7,737,372 B2 | * | 6/2010 | Dougherty et al. ........... 177/245 |
| 7,999,198 B2 | * | 8/2011 | Shrak et al. ................. 177/25.19 |
| 8,330,057 B2 | * | 12/2012 | Sharawi et al. ............. 177/25.19 |
| 8,471,721 B2 | * | 6/2013 | Tong et al. ..................... 340/666 |
| 8,604,939 B2 | * | 12/2013 | Satoh et al. ................... 340/666 |
| 8,674,243 B2 | * | 3/2014 | Curotto .................. G06Q 10/30 177/136 |
| 2002/0077875 A1 | * | 6/2002 | Nadir ................................ 705/8 |
| 2005/0217903 A1 | | 10/2005 | Roberts et al. |
| 2006/0054364 A1 | | 3/2006 | Kamakau |
| 2014/0060942 A1 | * | 3/2014 | Qu ................................ 177/136 |

FOREIGN PATENT DOCUMENTS

WO      WO 2010051963 A1 *  5/2010    ............. G01G 19/52

* cited by examiner

*Primary Examiner* — Randy W Gibson
(74) *Attorney, Agent, or Firm* — David C. Isaacson; Fitzgerald & Isaacson, LLP

(57) ABSTRACT

A refuse container provides an indication of the weight of the refuse stored therein and provides a danger alert when the weight of the refuse nears or exceeds a predetermined maximum. A display can display a value based on the weight of the refuse held in the refuse container. Further, one or more light sources can provide an indication of the weight of the refuse held in the refuse container. For example, the number of light source lit can provide an indication of the weight of the refuse held in the refuse container. A scale in the refuse container measures the weight of the refuse held therein. A controller uses the weight of the refuse held in the refuse container to determine the value to display on the display and whether to activate the light sources.

18 Claims, 5 Drawing Sheets

| Location | Max. Weight |
|---|---|
| Location 1 | Max. Weight 1 |
| Location 2 | Max. Weight 2 |
| Location 3 | Max. Weight 3 |
| ... | ... |
| Location N | Max. Weight N |

REFUSE CONTAINER WITH WEIGHT
INDICATOR AND DANGER ALERTING

BACKGROUND

1. Field of the Invention

Embodiments of the present invention relate generally to healthy and safety. More specifically, embodiments of the present invention relate to a refuse receptacle that provides an alert to prevent dangerous weight conditions.

2. Background of the Invention

Those involved on the frontlines of refuse collection have a physically demanding job. Moving and lifting heavily loaded garbage cans or other refuse containers is hard work. Typically, there is no way for a refuse collector to know how heavy a particular garbage can is prior to moving or picking it up. How full a particular refuse container is may provide little information as to its weight. For example, a refuse container full of paper products may weigh very little, whereas a refuse container only partially full of more dense refuse such as metal or liquid product may be very heavy. Thus, it is virtually impossible for a refuse collector to know what effort to apply to move or lift a particular refuse container. As a result, refuse collectors are prone to injury, particularly if they are surprised by the weight of a refuse container they attempt to move or lift.

Such injuries affect refuse collectors and their employers alike. Refuse collectors suffer pain, recoupment time, lost wages, and potentially shortened careers. Employers suffer lost workers, increased insurance costs, and inefficiencies by having to replace workers or ask current workers to work overtime. Of course, requesting that current workers work overtime makes those workers more prone to fatigue and injury, thereby spiraling the cycle Some jurisdictions responsible for waste management provide regulations concerning refuse. For example, such jurisdictions may provide that refuse containers not exceed 50 or 60 pounds per container. However, there is little chance of anyone filling a refuse container to have any idea of the weight of refuse already in the container or how much additional weight can be added to the container without violating a jurisdictional regulation.

BRIEF SUMMARY OF THE INVENTION

In an embodiment, a refuse container provides an indication of the weight contained therein as well as an alert to warn a refuse collector when a maximum weight is nearing or has been exceeded.

In an embodiment, the refuse container comprises a body in which refuse is held, a scale to measure the weight of the refuse held in the body, and a controller to cause an alert to be provided based on the weight of the refuse. For example, the alert can be provided when the weight of the refuse exceeds a percentage of a predetermined maximum weight or percentage thereof. In addition to or in lieu of the alert, an indication of the weight of the refuse being held in the refuse container can be provided. In an embodiment, a display is provided to allow display the weight of the refuse in the refuse container. In an embodiment, light sources are activated in accordance with the weight of the refuse stored in the container. In an embodiment, the predetermined maximum weight is determined based on a location of the refuse container.

Another embodiment is a method for providing an alert in a refuse container. The method includes measuring a weight of refuse held in the refuse container as a measured weight using a scale, comparing the measured weight to a predetermined maximum weight, and providing an alert based on the comparison. In addition to or in lieu of the alert, an indication of the weight of the refuse being held in the refuse container can be provided. In an embodiment, the method includes displaying the weight of the refuse in the refuse container. In an embodiment, the method includes activating light sources accordance with the weight of the refuse stored in the container. In an embodiment, the method include determining the predetermined maximum weight on a location of the refuse container.

In an embodiment, a table containing one or more entries, each entry having a location and a corresponding maximum weight is stored in a memory. In an embodiment, to determine the predetermined maximum weight, a location of the refuse container is determined. The determined location is compared to the locations in the table. If there is a match the maximum weight stored in the entry with the location that matched the determined location of the refuse container is used as the predetermined maximum. If there is no match, a user can be prompted for a maximum weight to use or a default maximum weight can be used.

Additional features and embodiments of the present invention will be evident in view of the following detailed description of the invention.

BRIEF DESCRIPTION OF THE DRAWINGS

FIG. 4 is an exemplary table for storing locations and corresponding maximum weight values according to an embodiment of the present invention.

DETAILED DESCRIPTION

Figure 1A:
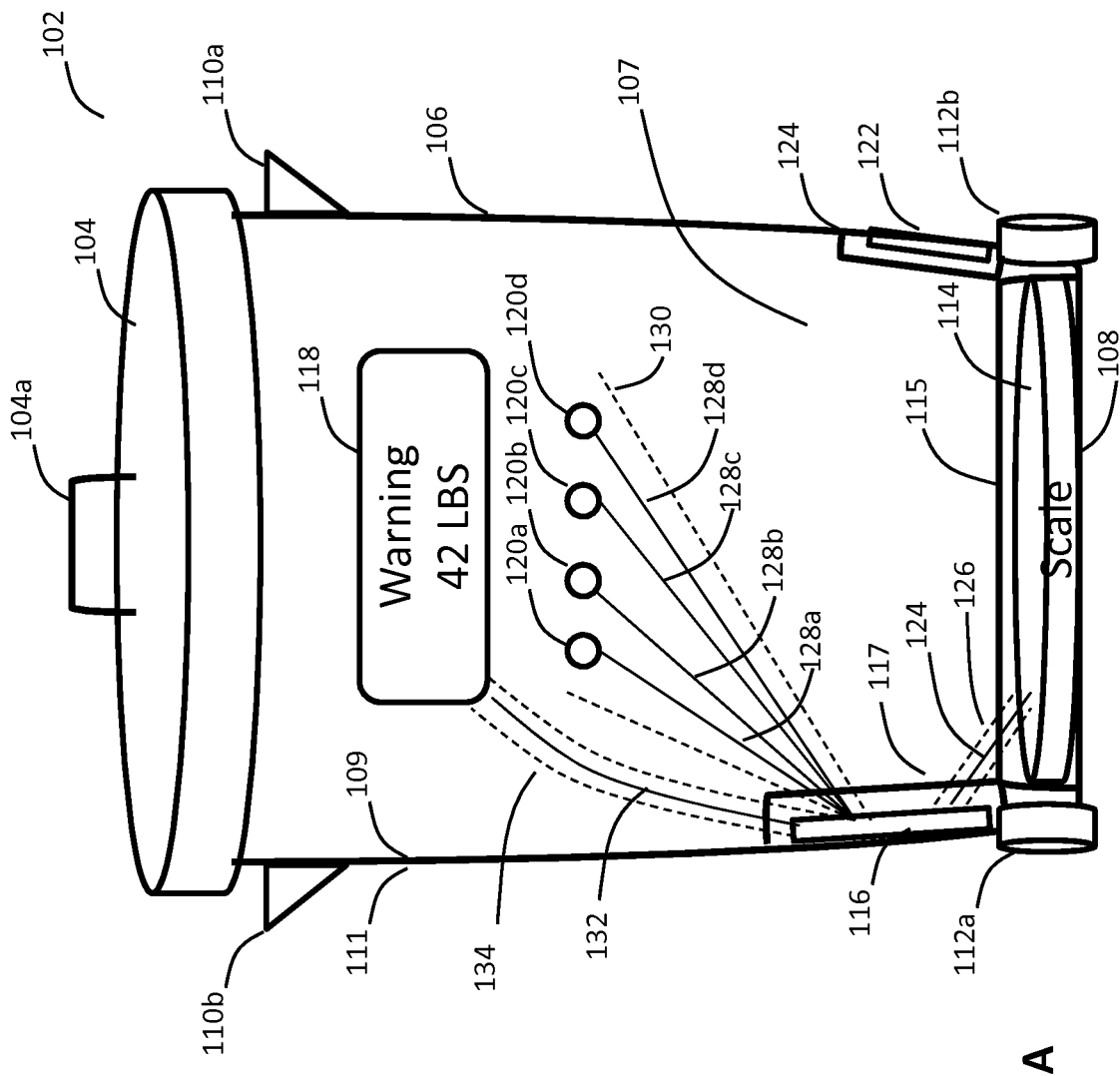
FIG. 1A illustrates an exemplary refuse container having an alert mechanism according to an embodiment of the present invention.

FIG. 1A illustrates an exemplary refuse container 102 having an alert mechanism according to an embodiment of the present invention. In an embodiment, refuse container 102 includes a lid 104. In an embodiment, lid 104 includes a handle 104a. Lid 104 can be detachable from body 106. Lid 104 can also be attached to body 106 via a hinge to allow the lid to be opened and closed.

Refuse container 102 also includes a body 106. Body 106 can be formed with one or more walls. The wall(s) forming body 106 have an inner surface 109 and an outer surface 111. Body 106 can be formed of any suitable material, including, without limitation rubber, metal, plastic, composite material, or combinations thereof. Body 106 encloses an inner volume 107. Refuse container 106 also includes a floor 108. In an embodiment, refuse container 102 includes one or more wheels 112a and 112b to facilitate movement of refuse container 102. In an embodiment, refuse container 102 includes one or more handles, for example, handles 110a and 110b. Handles 110a and 110b can be used for lifting or moving refuse container 102.

According to an embodiment, refuse container 102 includes a scale 114. Scale 114 can be any device that can be used to measure a weight of refuse placed on top of it. In an embodiment, scale 114 is calibrated when ready to be deployed such that scale 114 registers zero weight with no refuse in the container. Scale 114 can also be calibrated to take into consideration other weights, such as garbage bag weight for garbage bags that will hold refuse that is placed in refuse container 102. Scale 114 can be placed on top of floor 108, partially embedded in floor 108, or fully embedded in floor 108. Further, in an embodiment, floor 108 can comprises a bottom surface and a top surface, and scale 108 can be placed between the bottom and top surfaces of floor 108 such that the top surface of floor 108 covers scale 114. In an embodiment, scale 114 is protected by a protective covering 115. Protective covering 115 should allow accurate weight measurement by scale 114.

Refuse container 102 includes a controller 116 that is used to provide control function for refuse container 102 as described herein. In an embodiment, controller 116 is protected by a protective covering 117.

In an embodiment, refuse container 102 includes a display 118. In an embodiment, display 118 provides a digital readout. In an embodiment, the digital readout represents the weight of refuse in refuse container 102 as measured by scale 114. In another embodiment, the digital readout represents the amount of weight that can still be added to refuse container 102 without exceeding a preset limit. In an embodiment, display 118 is configured to provide a warning message when the weight of refuse in refuse container 102 exceeds a preconfigured maximum weight, or percentage thereof.

In an embodiment, refuse container 102 includes one or more light sources 120a-d. Four light sources 120a-d are illustrated in the exemplary refuse container 102 for purposes of description. However, any number of light sources can be used for a particular implementation. Light sources 120a-d can be lamps, light emitting diodes (LEDs), or any other light source. Embodiments can be configured to have a display, such as display 118, one or more light sources, such as light sources 120a-d, or both a display 118 and one or more light sources.

In an embodiment having a plurality of light sources 120a-d, each light source 120a-d is the same color. In an alternate embodiment having a plurality of light sources 120a-d, each light source 120a-d is a different color. In yet another embodiment having a plurality of light sources 120a-d, subsets of light sources 120a-d are the same color, while different subsets of light sources 120a-d are different colors.

In an embodiment, with only one light source, for example light source 120s, activation of the light source indicates that a maximum weight limit has been reached and no more refuse can be placed in refuse container 102 without exceeding the weight limit. In an alternate embodiment, activation of the light source indicates that a maximum weight limit has not been reached and additional refuse can be added to refuse container 102.

In an embodiment, controller 116 receives weight measurements from scale 114 and uses those weight measurements to control display 118 and light sources 120a-d to indicate weight of the refuse in refuse container 102 and to provide danger alerting. In an embodiment, communications between controller 116 and scale 114 occur over a wire 124. In an embodiment, wire 124 is located wholly between inner surface 109 and outer surface 111. For protection, a protective conduit 126 can be provided to allow wire 124 to be run from controller 116 to scale 114 through protective conduit 126. In an embodiment, protective conduit 126 is molded in or attached to body 106. Protective conduit 126 can be made from the same material(s) as body 106 or other suitable material. In an embodiment, protective conduit 126 is located wholly between inner surface 109 and outer surface 111. In an alternate embodiment, communication between controller 116 and scale 114 is wireless. In such an embodiment, protective conduit 126 may not be required.

In an embodiment, communications between controller 116 and light sources 120a-d occur over wires 128a-d respectively. For protection, a protective conduit 130 can be provided to allow wires 128a-d to be run from controller 116 to light sources 120a-d through protective conduit 130. In an embodiment, wires 128a-d are located wholly between inner surface 109 and outer surface 111. In an embodiment, there is a conduit 130 for each wire 128a-d. In an embodiment, protective conduit 130 is molded in or attached to body 106. Protective conduit 130 can be made from the same material(s) as body 106 or other suitable material. In an embodiment, protective conduit 130 is located wholly between inner surface 109 and outer surface 111. In an alternate embodiment, communication between controller 116 and light sources 120a-d is wireless. In such an embodiment, protective conduit 130 may not be required.

In an embodiment, communications between controller 116 and display 118 occur over a wire 132 respectively. In an embodiment, wire 132 is located wholly between inner surface 109 and outer surface 111. For protection, a protective conduit 134 can be provided to allow wire 132 to be run from controller 116 to display 118 through protective conduit 134. In an embodiment, there is a conduit 134 for wire 132. In an embodiment, protective conduit 134 is molded in or attached to body 106. Protective conduit 134 can be made from the same material(s) as body 106 or other suitable material. In an embodiment, protective conduit 134 is located wholly between inner surface 109 and outer surface 111. In an alternate embodiment, communication between controller 116 and display 118 is wireless. In such an embodiment, protective conduit 134 may not be required.

Refuse container 102 also includes a power source 122. Power source 122 provides power to the components of refuse container 102 that may need it. For example, in an embodiment, power source 122 is used to provide power to components such as display 118, light sources 120a-d, scale 114, and controller 116. Other components may require power in a particular implementation. Power source 122, can be any power source that can be configured to provide the required power, including batteries and AC power sources. In an embodiment, power source 122 is protected by a protective covering 124.

In use, refuse is placed within inner volume 107 and on floor 108 or directly on scale 114 such that the weight of the refuse is measured by scale 114. Measurement of refuse weight by scale 114 causes a read out to be displayed on display 118. In addition, one or more light sources 120a-d may be activated depending on the weight of refuse in refuse container 102 measured by scale 114. As described above, in one embodiment, the read out and lights sources are related to the weight of refuse that is in refuse container 102. Alternately, the read out and light sources indicate that additional refuse can be added to refuse container 102.

Figure 1B:
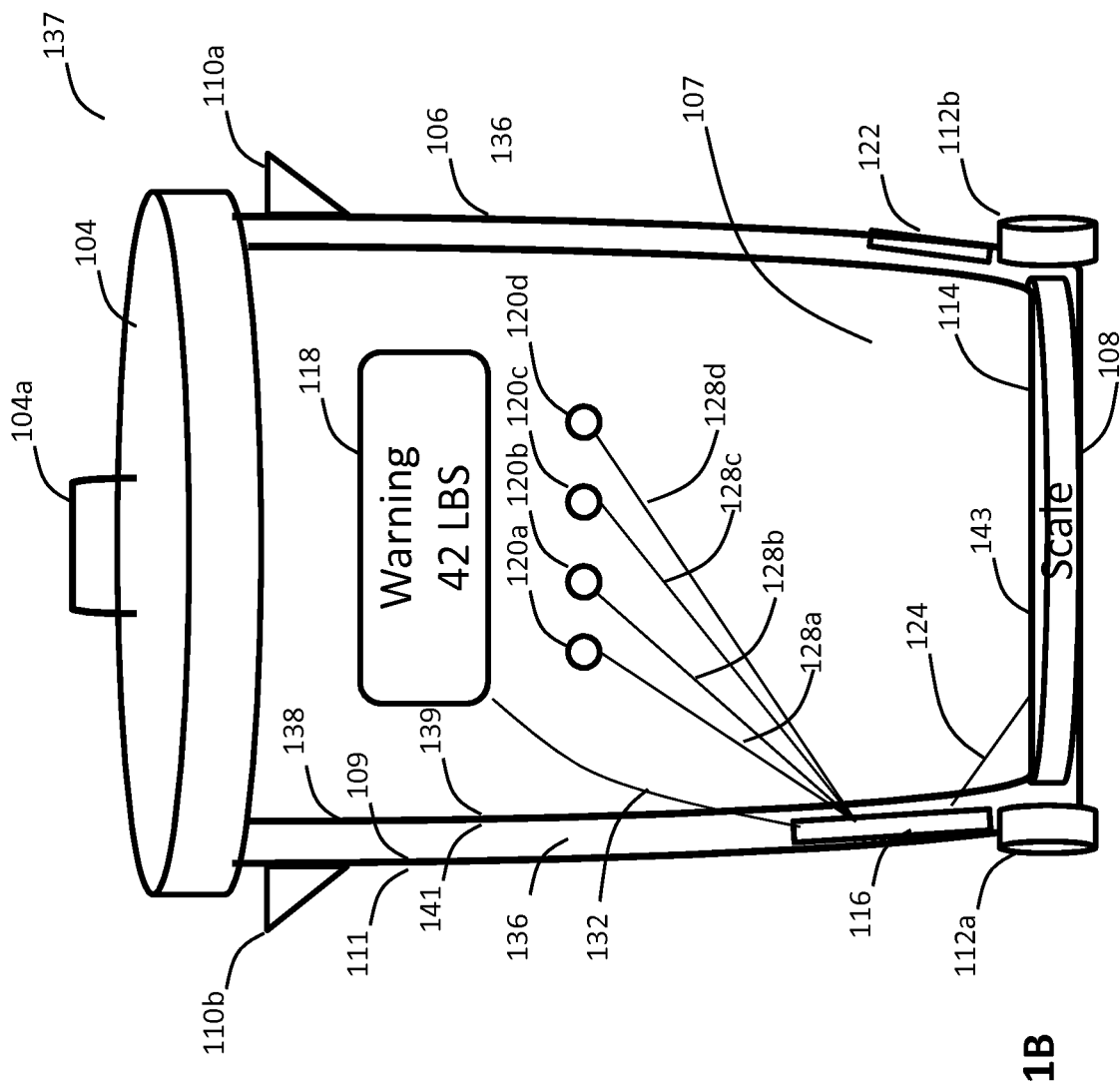
FIG. 1B illustrates an exemplary refuse container having an alert mechanism according to an alternate embodiment of the present invention.

FIG. 1B illustrates an exemplary refuse container 137 having an alert mechanism according to another embodiment of the present invention. Like numbered items in FIG. 1A are referenced similarly in FIG. 1B. Refuse container 137 includes an inner shell 138. Inner shell 138 can be a separate unit from body 106 or a part of body 106. Further, inner shell 138 and body 106 can be formed from a unitary material. Inner shell 138 can be the same material as body 106 or any other suitable material. Inner shell 138 can be formed with one or more walls. Like the wall(s) of body 106, the wall(s) of inner shell 138 has an inner surface 139 and an outer surface 141.

In an embodiment, inner shell 138 includes a floor 143. Floor 143 must be configured to allow accurate weight measurements by scale 114. In another embodiment, inner shell 138 does not have a floor. In such embodiment, the wall(s) of inner shell 138 can be affixed to scale 114 such that scale 114 effectively forms a floor for inner shell 138. In such a case, a protective covering, such as protective covering 115 can be used to protect scale 114.

As can be seen in FIG. 1B, inner surface 109 of body 106 and outer surface 141 of inner shell 138 form a space 136. In an embodiment, space 136 is an empty space. In an embodiment, space 136 is filled with a material. In an embodiment, controller 116, power source 122, and wires 124, 128*a-d*, and 132 are wholly contained within space 136. In this manner the materials of body 106 and inner shell 138 provide protection to these components. Scale 114 may fit partially or wholly within space 136. For example, scale 114 is partially in space 136 when it acts as an effective floor for inner shell 138 as described above. Light sources 120*a-d* and display 118 are partially within space 136. These components are protected by the materials of body 106 and inner shell 138 at least to the extent they are included in space 136. In an embodiment, one or more conduits are included in space 136 through which to run wires such as wires 120*a-d*, 124, and 132.

Body 106 of refuse containers 102 and 137 can be any suitable shape. Such shapes include, for example and without limitation, circular, square, rectangular, oval, diamond, and square or rectangular with rounded corners. Further, inner shell 138 can be, but need not be, the same shape as body 106.

Figure 2:
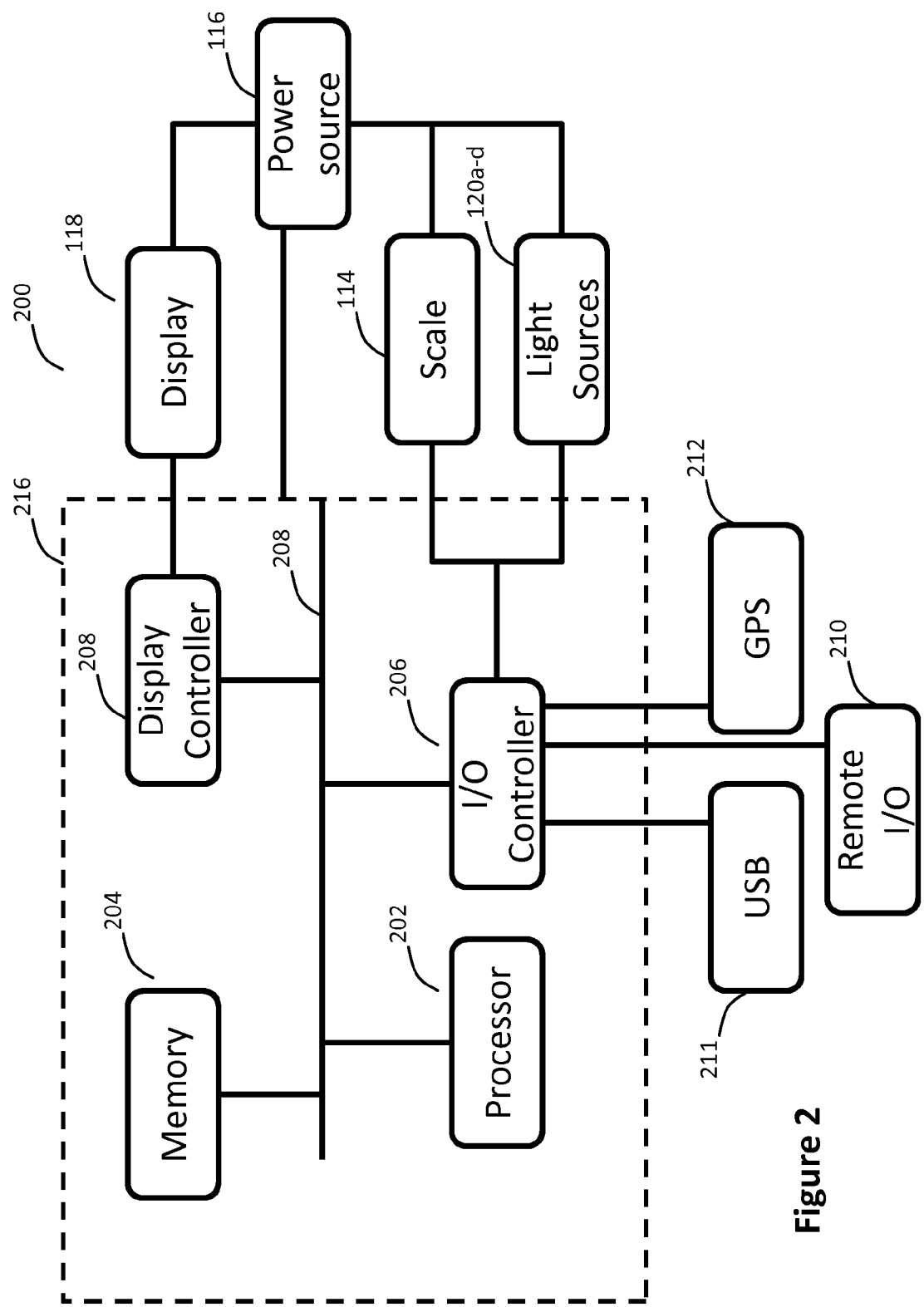
FIG. 2 is a schematic diagram of a system for providing alerting for a refuse container according to an embodiment of the present invention.

FIG. 2 is a schematic diagram of an exemplary system 200 to provide alerting for a refuse container according to an embodiment of the present invention. System 200 includes a controller 216. Exemplary controller 116 of FIGS. 1A and 1B can be a controller 216 as illustrated in FIG. 2. It should be understood that an appropriate controller for use in embodiments is not limited to the structure illustrated in FIG. 2. As such in an embodiment, a controller for use in embodiments may have more or fewer components than illustrated in FIG. 2.

As illustrated in FIG. 2, in an embodiment, controller 216 includes a processor 202. Processor 202 can be a microprocessor, microcontroller, or any other device that can be configured to control alerting in a refuse container as described herein. Controller 216 also includes a memory 204. Memory 204 stores program code and other information required to allow processor 202 to perform the functions described herein. Memory 204 can also include external memory, such as CD-ROM, memory stick, hard disk, and other external memories. Memory 204 can be in one or more memory devices, and thus can be any combination of internal and/or external memory. Further memory 204 or portions thereof can be coupled to bus 208 directly and/or indirectly. Not all of memory 204 need be part of controller 216 and embodiments of controller 216 may rely solely on external memory.

Controller 216 includes an input/output (I/O) controller 206. I/O controller 206 inputs measurements from scale 108 and outputs signals to light sources 120*a-d*. Controller 216 also includes a display controller 208. Display controller 208 provides signals to control display 118.

In an embodiment, controller 216 includes a bus 208. Bus 208 provides for communication between various components of controller 216, such as, for example, processor 202, memory 204, I/O controller 206, and display controller 208. Controller 216 can be configured as one or more devices depending upon application, and may have more or fewer components than shown in FIG. 2.

In operation, processor 202 compares weight values measures by scale 114 to a maximum weight and causes panel display 118 and/or light sources 120*a-d* to be activated accordingly. To determine the maximum weight, a configuration phase is performed. The configuration phase can be performed by the manufacturer and/or by an end user. In one embodiment, a configuration phase is entered into by causing processor 202 to enter into the configuration phase. In an embodiment, this is accomplished using a remote controlling device that provides a configuration signal that is detected by remote I/O detector 210. In an embodiment, when remote I/O detector 210 detects a remote configuration signal, it causes an interrupt to processor 202 that causes processor 202 to be placed in a configuration state or phase. In an embodiment, the remote signal can be supplied by a remote controller, a mobile phone have an application executing thereon to perform a configuration as described herein, or any other device to provide a remote control signal for configuration.

In an embodiment, in the configuration state or phase 202, processor 202 causes panel display 118 to display a menu from which one or more choices for set up can be chosen. In one embodiment, for example, display 118 displays, "(1) City/State" then "(2) Zip code", and then "(3) Work Place." Different or additional selections may be available in different embodiments depending on implementation. For example, county, township, area code, or other location information may be used.

If display 118 does not have a sufficient number of lines to display the menu in total, the choices can be displayed in succession and with a hold time. For example, if display 118 has only one line, the three exemplary choices provided above could be displayed one at a time in succession and with a 2-3 second hold time.

If a user chooses 1, processor 202 causes panel display 118 to prompt the user to input a city and state via the remote controller. If the user chooses 2, processor 202 causes panel display 118 to prompt the user to input a zip code. If the user chooses 3, processor 202 causes panel display 118 to prompt the user to input a work place, for example, an employer name or an address.

In an embodiment, in which a mobile phone has an application executing thereon for configuring a refuse container according to an embodiment, the application executing on the mobile phone causes a menu with appropriate choices to be displayed to the user. They user then selects the desired choice, and is prompted to input appropriate information corresponding to the user's choice, for example, a city and state, a zip code, or an employer's name or address. The information is then transmitted for use by processor 202 through remote I/O device 210.

In another embodiment, refuse container 102 includes a port, such as a USB port that can be coupled to a computing device, such as a laptop, desktop, tablet, mobile telephone, or other computing device that can be coupled to processor 202 through the port. In such a case, an application executing on the computing device provides a menu with appropriate choices to be displayed to the user. The user then selects the desired choice, and is prompted to input appropriate information corresponding to the user's choice, for example, a city and state, a zip code, or an employer's name or address. The information is then transmitted for use by processor 202 through USB port 211.

In another embodiment, refuse container 102 includes a global positioning system (GPS) device 212. Other determining location devices can be used as well. GPS device 212 determines location of refuse container 102. In an embodiment with GPS device 212, during the configuration phase, processor 102 obtains location information from GPS device 212. Such location information can include, but is not limited to, latitude and longitude information.

The user's input in response to the prompt is compared against pre-stored data to obtain a maximum weight. For example, in an embodiment, a table of city/state pairs and corresponding weights can be stored in memory 204. Similarly, a table of zip codes and corresponding maximum weights can be stored in memory 204. Similarly, a table of company names and/or addresses and corresponding weights can be stored in memory 204. In general, a table contained any location data for a particular application and corresponding maximum weight information can be stored.

The table of location data and corresponding maximum weights can be configured by a manufacturer or provided during the configuration phase. The location data can be any information that can be used to provide a location. In either case, the table can be stored in memory 204. FIG. 4 is an exemplary table 400 for associating location data with maximum weight data. As shown in FIG. 4, in an embodiment, table 400 includes a set of entries, each entry including location information, for example, locations 1 through N, and corresponding maximum weight data, in this case, maximum weights 1 through N, respectively.

In an embodiment, a number of tables, such as table 400, are included. Each of the included tables has a different location data type with corresponding maximum weight entries. For example, one table may have zip codes; another may have cities, another may have towns; another may have latitude and longitude, and so forth.

In operation according to an embodiment, an appropriate user input in response to a prompt is compared against the location data of the entries in the table of location data and corresponding maximum weight values to find a match. For example, if the user enters a zip code, processor 202 compares the use entered zip code to zip codes in a table of zip codes and corresponding maximum weight values. In an embodiment with GPS device 212, the location information obtained from GPS device 212 is compared to the entries in the table. In an embodiment, the GPS information is converted to another location type, for example, zip code, city, town, or street address.

The maximum weight corresponding to the matching entry is retrieved. The retrieved maximum weight is then stored in a maximum weight location in memory. The obtained maximum weight can be stored in a permanent fashion, and updated only upon initiation of the configuration phase described above.

If there is no matching entry, the user is again prompted to enter the information for the user's prompt selection. In addition, the user can also select enter a user-defined maximum weight or choose to use a default maximum weight. In an embodiment, the user can select the default maximum weight as an option on the menu. In an alternative embodiment, the default maximum weight is used if the user fails some number of times to make a matching entry, for example, after 3 tries.

In an embodiment having a GPS device 212, when there is no matching entry, the user need not be prompted to reenter location information. Instead, the user selects whether to enter a maximum weight or use a default. In an embodiment, the user can select the default maximum weight as an option on the menu. In an alternative embodiment, the default maximum weight is used if there is no matching entry to location information provided by GPS device 212.

Embodiments having a GPS device 212 can include an operational mode in which they operate as described above with respect to embodiments not having a GPS device 212. That is, in such a mode, the embodiment will operate as if there were no GPS device 212. This can be useful if GPS device 212 is not operating correctly for some reason, such as weather or technical issues that interfere with the ability to acquire or track the GPS satellite signal.

Figure 3:
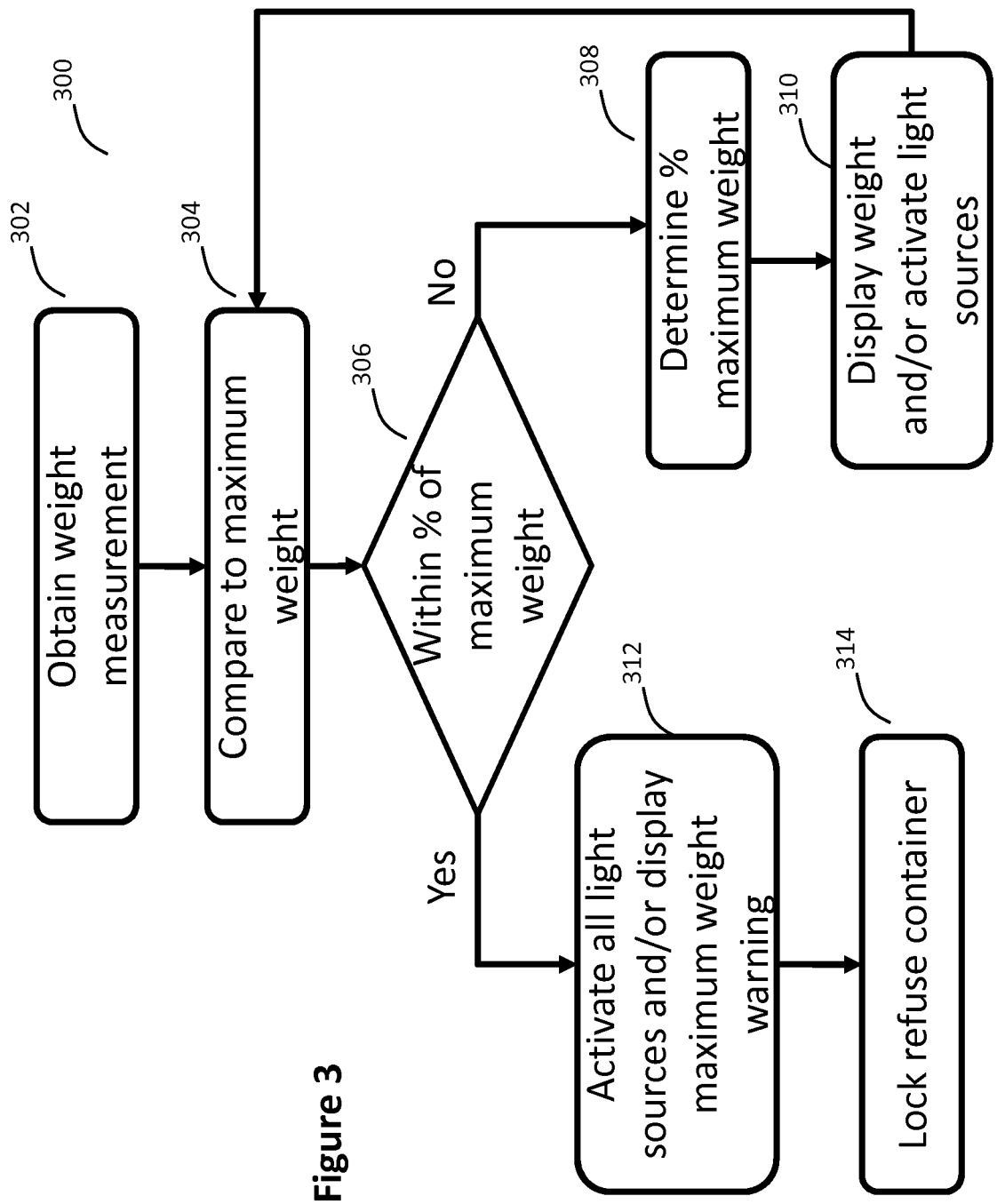
FIG. 3 is flow chart for controlling a refuse container display and light source(s) according an embodiment of the present invention.

FIG. 3 is a flow chart 300 for controlling display 118 and light source(s) 120a-d to provide an alert concerning the weight of refuse in refuse container 102 according an embodiment. In step 302 a current weight measurement is obtained from scale 114. The current weight measurement can be stored in memory 204. In an embodiment, the current weight measurement is stored with a current date and time stamp. In an embodiment, one or more prior weight measurements, along with their corresponding date and time stamps, are stored in memory 204 to provide a history of weight measurements provided by scale 114.

Processor 202 then continues in step 304 in which the obtained current weight measurement is compared against the maximum weight measurement stored in memory 204. If the maximum weight is not exceeded, in step 308, the percentage of maximum weight of the weight of the refuse in refuse container 102 as measured by scale 114 is determined. In step 310, the weight of refuse in container 102 and/or the percentage of maximum weight is displayed on display 118. In addition, as described below one or more light sources 120 are activated in accordance with the percentage of maximum weight of the refuse in refuse contained 102. In an embodiment, a higher number of light sources 120 activated indicates a greater weight of refuse in refuse container 102. For example, if the percentage of maximum weight of the refuse in refuse container 102 is determined to be 75%, then three light sources are activated in a four-light source embodiment.

If there is not an exact percentage of light sources to activate then the number of light sources to activate can be rounded to the nearest higher or lower representable percentage. For example, if the percentage of maximum weight of refuse in refuse container 102 was 85%, then in an embodiment, three light sources in a four-light source embodiment are activated as 75% is the nearest lower representable percentage. In an alternative embodiment, if the percentage of maximum weight of refuse in refuse container 102 was 85%, then in an embodiment, four light sources in a four-light source embodiment are activated as 100% is the nearest higher representable percentage.

In an alternate embodiment, the difference between the maximum weight and the weight of the refuse in refuse container 102 is displayed on display 118. Displaying the difference in this manner indicates the weight of refuse that can still be placed in refuse container 102 without exceeding the maximum weight. In addition, one or more light source 102 is illuminated in accordance with the weight difference. In the alternate embodiment, a higher number of lights sources 120 that are illuminated indicates that a lesser weight of refuse can be added.

Other methods for indicating the weight of refuse in refuse container 102 and activating representative light sources are possible, including, for example, and without limitation, weight percentage remaining, where more activated light sources indicate higher remaining refuse capacity. This may prove useful in saving battery life in cases where refuse container 102 is more often full than not.

If in step 306, processor 202 determines that the maximum weight has been exceeded, processor 202 continues in step 312 where processor 202 causes panel display 312 to display the weight contained in refuse container 102 and causes all light sources 120a-d to illuminate. In an embodiment, at least one of light sources 120a-d can be caused to flash when the weight of the refuse in the refuse container exceeds the maximum weight. In an alternate embodiment, processor 102 causes panel display 118 to display the maximum weight to indicate that the refuse in container 102 has reached or exceeded the maximum weight.

In an alternate embodiment, where the difference is used, panel display will display the difference. In an embodiment, the displayed difference can be 0 or negative number to indicate by how much the refuse in container 102 exceeds the maximum weight. In another embodiment, panel display 118 displays 0 to indicate that the refuse in container 102 has reached or exceeded the maximum weight.

In an embodiment, processor 202 continues in step 314 where it locks lid 104 to prevent additional refuse from being added to container 102. The locking mechanism can be any mechanism that can be used to lock lid 104, including mechanical, electro-mechanical, and magnetic locking mechanisms. In an embodiment, refuse container 102 includes a sensor to determine when refuse container 102 is partially or completely inverted. Processor 202 causes the locking mechanism to be released when refuse container 102 is partially or completely inverted to allow emptying of refuse container 102. In another embodiment the locking mechanism can be released with the push of a button or by manually releasing the locking mechanism. Step 314 is optional and may not be included in some embodiments.

While comparing against the maximum weight measurement in step 304 is acceptable in some embodiments, there is a possibility that using the actual maximum weight will result in exceeding the maximum weight. As a result, in an embodiment, a percentage of maximum weight is used for comparison in step 306. For example, if the maximum weight in a particular application is 50 pounds, the percentage may be 90%. In that case, the comparison maximum weight used in step 304 would be 45 pounds rather than 50 pounds. Using a percentage of maximum weight in this manner provides a cushion so that exceeding the maximum weight is less likely.

In an embodiment, the percentage of maximum is configured by calculating the percentage maximum weight and storing that calculated value in a percentage maximum weight location in memory. Thereafter, processor 202 uses the percentage maximum weight rather than maximum weight, except when displaying a maximum weight value. In an alternate embodiment, the maximum weight value stored in the maximum weight location in memory 204 is replaced with the percentage maximum weight value.

In an embodiment, the percentage of maximum weight can be changed by the user during the configuration phase. In an embodiment, a default percentage can be stored. For example, the default percentage may be 100% or 95% depending upon application.

As described above, a history of weight measurements and corresponding date and time stamps can be stored in memory 204. In an embodiment, these historical weight measurements can be accessed remotely by a service provider and analyzed. For example, the analysis may be used to determine users that consistently overload refuse container 102. In such a case, a notice can be sent to the user to advise the user to avoid overloading refuse container 102 in the future, or that service fees will be increased. In addition, in an embodiment, the notice can be provided on display 118. Further, the analysis can be used to determine the amount of refuse a particular user is generating so that appropriate fees can be assessed.

Remote access can be by transmission of the historical data over Wi-Fi hotspot or any other technique to transmit the historical data to the service provider, including without limitation cable, cellular telephone network, and satellite transmission. In an embodiment, historical weight data can be transmitted to a service provider according to any schedule, whether periodic or non-periodic. In an embodiment, the historical data is deleted after transmission of the historical data to the service provider.

Weight measurements of the refuse in refuse container 102 can be made according to any schedule, and can be periodic and non-periodic. Examples of periodic weight measurements include, without limitation, measuring the weight once a week, once a day, once an hour, once a minute, etc. Non-periodic weight measurements include, without limitation, measurements according to a non-periodic schedule stored in memory 204. Another example of a non-periodic weight measurement is to configure controller 216 can be configured to accept remote control commands to cause a weight measurement to be performed. In this manner, a service provider can cause a weight measurement at any desired time. In another exemplary non-periodic weight measurement paradigm, a sensor on lid 104 can be configured to trigger a weight measurement when the lid is removed, thereby indicating either additional refuse is being added to refuse container 102 or refuse container 102 is about to be emptied.

The alert provided by a refuse container as described herein is not limited to visual alerts. Audible alerts can be provided in embodiments. For example, a beep or other audible alert can be provided when the weight of the refuse in the container nears or reaches a predetermined limit.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A refuse container, comprising:
a body in which refuse is held;
a lid;
a scale to measure a weight of the refuse being held in the body of the refuse container;
a memory in which is stored a history of the weights that are measured by the scale;

a controller to cause an alert to be provided based on the weight of the refuse, wherein the refuse container is configured to transmit the stored weight history to a service provider; and a locking mechanism to lock the lid to prevent further refuse from being placed in the refuse container when the weight of refuse in the refuse container reaches a predetermined weight.

2. The refuse container of claim 1, further comprising a display to display a value determined in accordance with the weight of the refuse being held in the body of the refuse container.

3. The refuse container of claim 2, wherein the value displayed on the display on the display is the weight of the refuse in the container.

4. The refuse container of claim 2, wherein the value displayed on the display is based on the weight of refuse that can be placed in the body without exceeding a predetermined maximum weight.

5. The refuse container of claim 2, wherein the value displayed on the display is based on the difference between a predetermined maximum weight and the weight of the refuse in the body.

6. The refuse container of claim 2, wherein the alert comprises a warning message displayed on the display when the weight of the refuse held in the body of the refuse container nears a predetermined maximum weight.

7. The refuse container of claim 1, further comprising one or more light sources that are activated in accordance with the weight held in the body of the refuse container.

8. The refuse container of claim 7, wherein the number of the one or more light sources that are activated is determined in accordance with the proportion of the weight of refuse in the body of the refuse container to a predetermined maximum weight.

9. The refuse container of claim 7, wherein the alert comprises flashing at least one of the one or more light sources.

10. The refuse container of claim 1, wherein the scale is calibrated.

11. The refuse container of claim 1, wherein the alert is based on how close the weight is to a predetermined maximum weight.

12. The refuse container of claim 1, wherein the memory comprises:

a table that has at least one entry that contains a location and a corresponding maximum weight; wherein the controller determines a location of the refuse container and uses the determined location as a look up into the table find a table entry having a location matching the determined location, and uses the corresponding maximum weight stored in the table entry with the matching location as the criterion for providing an alert.

13. A method for providing an alert in a refuse container, comprising:

measuring a weight of refuse held in the refuse container as a measured weight using a scale;

storing a history of the measured weights in a memory;

transmitting the history of stored weights to a service provider;

comparing the measured weight to a predetermined maximum weight;

providing an alert based on the comparison; and locking a lid of the refuse container to prevent further refuse from being placed in the refuse container when the weight of refuse in the refuse container reaches a predetermined weight.

14. The method of claim 13, further comprising providing the alert when the measured weight exceeds the predetermined maximum weight.

15. The method of claim 13, further comprising providing the alert when the measured weight is within a percentage of the maximum weight.

16. The method of claim 13, further comprising displaying a value on a display in accordance with the measured weight.

17. The method of claim 13, further comprising activating one or more light sources in accordance with the measured weight.

18. A refuse container, comprising:

a body in which refuse is held;

a scale to measure a weight of the refuse being held in the body of the refuse container;

a memory in which is stored a history of the weights that are measured by the scale, wherein the memory comprises a table that has at least one entry that contains a location and a corresponding maximum weight; wherein the controller determines a location of the refuse container and uses the determined location as a look up into the table find a table entry having a location matching the determined location, and uses the corresponding maximum weight stored in the table entry with the matching location as the criterion for providing an alert; and a controller to cause an alert to be provided based on the weight of the refuse, wherein the refuse container is configured to transmit the stored weight history to a service provider.

* * * * *